INVENTOR.
DONALD T. TANG
BY Edward G. Fiorito
ATTORNEY

Feb. 11, 1969 D. T. TANG 3,427,444

CODING CIRCUITS FOR DATA TRANSMISSION SYSTEMS

Filed Feb. 15, 1965 Sheet 2 of 4

FIG. 4a

| TIME | INPUT 7 | D6 | D5 | D4 | D3 | TERM. R |
|---|---|---|---|---|---|---|
| T0 | 0 | 0 | 0 | 0 | 0 | 0 |
| T1 | 1 | 0 | 0 | 0 | 1 | 0 |
| T2 | 0 | 0 | 0 | 1 | 0 | 0 |
| T3 | 0 | 0 | 1 | 0 | 0 | 0 |
| T4 | 1 | 1 | 0 | 0 | 0 | 1 |
| T5 | 0 | 0 | 0 | 0 | 1 | 1 |
| T6 | 0 | 0 | 0 | 1 | 0 | 0 |
| T7 | 0 | 0 | 1 | 0 | 0 | 0 |
| T8 | 0 | 1 | 0 | 0 | 1 | 1 |
| T9 | 1 | 0 | 0 | 1 | 0 | 1 |
| T10 | 1 | 0 | 1 | 0 | 1 | 0 |
| T11 | 0 | 1 | 0 | 1 | 1 | 1 |
| T12 | 0 | 0 | 1 | 1 | 0 | 1 |
| T13 | 0 | 1 | 1 | 0 | 0 | 1 |
| T14 | 0 | 1 | 0 | 0 | 0 | 0 |
| T15 | 0 | 0 | 0 | 0 | 0 | 1 |

T0–T11: SWITCH 61 ON TERMINAL I; T12–T15: 61 ON R (CHECK BITS)
T0–T15: SWITCH 53 OPEN

LOW REDUNDANCY MODE

FIG. 4b

| TIME | INPUT 7 | D6 | D5 | D4 | D3 | D2 | D1 | TERM. R |
|---|---|---|---|---|---|---|---|---|
| S0 | 0 | 0 | 0 | 0 | 0 | 0 | 0 | 0 |
| S1 | 1 | 0 | 0 | 0 | 1 | 0 | 1 | 0 |
| S2 | 1 | 0 | 0 | 1 | 1 | 1 | 0 | 1 |
| S3 | 0 | 0 | 1 | 1 | 0 | 0 | 1 | 1 |
| S4 | 0 | 1 | 1 | 0 | 1 | 1 | 0 | 0 |
| S5 | 0 | 1 | 0 | 1 | 0 | 0 | 1 | 1 |
| S6 | 0 | 0 | 1 | 0 | 1 | 1 | 0 | 0 |
| S7 | 1 | 1 | 0 | 1 | 0 | 0 | 1 | 0 |
| S8 | 0 | 0 | 1 | 0 | 1 | 1 | 0 | 0 |
| S9 | 0 | 1 | 0 | 1 | 1 | 0 | 0 | 0 |
| S10 | 0 | 0 | 1 | 1 | 0 | 0 | 0 | 1 |
| S11 | 0 | 1 | 1 | 0 | 0 | 0 | 0 | 1 |
| S12 | 0 | 1 | 0 | 0 | 0 | 0 | 0 | 0 |
| S13 | 0 | 0 | 0 | 0 | 0 | 0 | 0 | 1 |
| S14 | 0 | 0 | 0 | 0 | 0 | 0 | 0 | 0 |
| S15 | 0 | 0 | 0 | 0 | 0 | 0 | 0 | 0 |

S0–S9: SWITCH 61 ON TERMINAL I; S10–S15: SWITCH 61 ON R (CHECK BITS)
S0–S15: SWITCH 53 CLOSED

HIGH REDUNDANCY MODE

FIG. 5a

| TIME | INPUT 21 | DE | DC | DB | DA | TERM. 57' | DET. 77 | ERROR 83 |
|---|---|---|---|---|---|---|---|---|
| N0 | 0 | 0 | 0 | 0 | 0 | 0 | 0 | 0 |
| N1 | 1 | 0 | 0 | 0 | 1 | 0 | 0 | 0 |
| N2 | 0 | 0 | 0 | 1 | 0 | 0 | 0 | 0 |
| N3 | 0 | 0 | 1 | 0 | 0 | 0 | 0 | 0 |
| N4 | 1 | 1 | 0 | 0 | 0 | 1 | 0 | 0 |
| N5 | [1] | 0 | 0 | 0 | 0 | 1 | 0 | 0 |
| N6 | 0 | 0 | 0 | 0 | 0 | 0 | 0 | 0 |
| N7 | 0 | 0 | 0 | 0 | 0 | 0 | 0 | 0 |
| N8 | 0 | 0 | 0 | 0 | 0 | 0 | 0 | 0 |
| N9 | 1 | 0 | 0 | 0 | 1 | 0 | 0 | 0 |
| N10 | 1 | 0 | 0 | 1 | 1 | 0 | 0 | 0 |
| N11 | 0 | 0 | 1 | 1 | 0 | 0 | 0 | 0 |
| N12 | 1 | 1 | 1 | 0 | 0 | 1 | 0 | 0 |
| N13 | 1 | 1 | 0 | 0 | 1 | 0 | 0 | 0 |
| N14 | 0 | 0 | 0 | 1 | 1 | 1 | 0 | 0 |
| N15 | 1 | 0 | 1 | 1 | 1 | 0 | 0 | 0 |
| N16 | 0 | 1 | 1 | 1 | 1 | 1 | 0 | 0 |
| N17 | 0 | 1 | 1 | 1 | 0 | 0 | 0 | 0 |
| N18 | 0 | 1 | 1 | 0 | 0 | 0 | 0 | 0 |
| N19 | 0 | 1 | 0 | 0 | 0 | 0 | 0 | 0 |
| N20 | 0 | 0 | 0 | 0 | 0 | 1 | 1 | [1] |
| N21 | 0 | 0 | 0 | 0 | 0 | 0 | 1 | 0 |
| N22 | 0 | 0 | 0 | 0 | 0 | 0 | 1 | 0 |
| N23 | 0 | 0 | 0 | 0 | 0 | 0 | 1 | 0 |
| N24 | 0 | 0 | 0 | 0 | 0 | 0 | 1 | 0 |
| N25 | 0 | 0 | 0 | 0 | 0 | 0 | 1 | 0 |
| N26 | 0 | 0 | 0 | 0 | 0 | 0 | 1 | 0 |
| N27 | 0 | 0 | 0 | 0 | 0 | 0 | 1 | 0 |
| N28 | 0 | 0 | 0 | 0 | 0 | 0 | 1 | 0 |
| N29 | 0 | 0 | 0 | 0 | 0 | 0 | 1 | 0 |
| N30 | 0 | 0 | 0 | 0 | 0 | 0 | 1 | 0 |

ERROR (N5); CORRECTION (N20)

SWITCH 81 OPEN (N0–N15); SWITCH 81 CLOSED (N16–N30)

SWITCHES 53' AND 71 OPEN

LOW REDUNDANCY MODE

FIG. 5b

| TIME | INPUT 21 | DG | DF | DE | DC | DB | DA | TERM 57' | DET 77 | ERROR 83 |
|---|---|---|---|---|---|---|---|---|---|---|
| L0 | 0 | 0 | 0 | 0 | 0 | 0 | 0 | 0 | 0 | 0 |
| L1 | 1 | 0 | 1 | 0 | 0 | 0 | 1 | 0 | 0 | 0 |
| L2 | 1 | 1 | 0 | 0 | 0 | 1 | 0 | 1 | 0 | 0 |
| L3 | 0 | 0 | 1 | 0 | 1 | 0 | 1 | 1 | 0 | 0 |
| L4 | 0 | 1 | 1 | 1 | 0 | 1 | 0 | 0 | 0 | 0 |
| L5 | 0 | 1 | 0 | 0 | 1 | 0 | 1 | 1 | 0 | 0 |
| L6 | 0 | 0 | 1 | 1 | 0 | 1 | 0 | 0 | 0 | 0 |
| L7 | 1 | 1 | 0 | 0 | 1 | 0 | 1 | 0 | 0 | 0 |
| L8 | 0 | 0 | 1 | 1 | 0 | 1 | 0 | 0 | 0 | 0 |
| L9 | [1] | 1 | 0 | 0 | 1 | 0 | 1 | 0 | 0 | 0 |
| L10 | 1 | 0 | 0 | 1 | 0 | 1 | 1 | 0 | 0 | 0 |
| L11 | [0] | 0 | 0 | 0 | 1 | 1 | 1 | 1 | 0 | 0 |
| L12 | 0 | 0 | 0 | 1 | 1 | 1 | 1 | 1 | 0 | 0 |
| L13 | 1 | 0 | 1 | 1 | 1 | 1 | 1 | 0 | 0 | 0 |
| L14 | 0 | 1 | 1 | 1 | 1 | 1 | 1 | 1 | 0 | 0 |
| L15 | 0 | 1 | 0 | 1 | 1 | 1 | 0 | 0 | 0 | 0 |
| L16 | 0 | 0 | 1 | 1 | 1 | 0 | 1 | 1 | 0 | 0 |
| L17 | 0 | 1 | 1 | 1 | 0 | 1 | 1 | 1 | 0 | 0 |
| L18 | 0 | 1 | 0 | 0 | 1 | 1 | 1 | 1 | 0 | 0 |
| L19 | 0 | 0 | 1 | 1 | 1 | 1 | 0 | 0 | 0 | 0 |
| L20 | 0 | 1 | 1 | 1 | 1 | 0 | 1 | 1 | 0 | 0 |
| L21 | 0 | 1 | 0 | 1 | 0 | 1 | 0 | 0 | 0 | 0 |
| L22 | 0 | 0 | 1 | 0 | 1 | 0 | 0 | 0 | 0 | 0 |
| L23 | 0 | 1 | 1 | 1 | 0 | 0 | 0 | 0 | 0 | 0 |
| L24 | 0 | 1 | 1 | 0 | 0 | 0 | 0 | 1 | 1 | [1] |
| L25 | 0 | 1 | 0 | 0 | 0 | 0 | 0 | 0 | 1 | 0 |
| L26 | 0 | 0 | 0 | 0 | 0 | 0 | 0 | 1 | 1 | [1] |
| L27 | 0 | 0 | 0 | 0 | 0 | 0 | 0 | 0 | 0 | 0 |
| L28 | 0 | 0 | 0 | 0 | 0 | 0 | 0 | 0 | 0 | 0 |
| L29 | 0 | 0 | 0 | 0 | 0 | 0 | 0 | 0 | 0 | 0 |
| L30 | 0 | 0 | 0 | 0 | 0 | 0 | 0 | 0 | 0 | 0 |

ERRORS (L9, L11); CORRECTIONS (L24, L26)

SWITCH 81 OPEN (L0–L15); SWITCH 81 CLOSED (L16–L30)

SWITCHES 53' AND 71 CLOSED

HIGH REDUNDANCY MODE

United States Patent Office 3,427,444

Patented Feb. 11, 1969

3,427,444

CODING CIRCUITS FOR DATA TRANSMISSION SYSTEMS

Donald T. Tang, Mount Kisco, N.Y., assignor to International Business Machines Corporation, Armonk, N.Y., a corporation of New York Filed Feb. 15, 1965, Ser. No. 432,480

U.S. Cl. 235—154 12 Claims

Int. Cl. G06f *5/00, 5/02*

ABSTRACT OF THE DISCLOSURE

An encoder is provided which includes a pair of shift registers interconnected by a pair of exclusive OR circuits and a switch. With the switch in open position, a 4 bit redundant code is generated. A 6 bit redundant code is generated when the switch is closed. One shift register operates for both codes.

This invention relates to circuits useful in data transmission systems and more particularly to circuits capable of multiplying, dividing, encoding or decoding a sequence of digits.

Communication channels often introduce errors when transmitting digital data. Many schemes have been devised for correcting the errors in the data after transmission. Frequently extra data bits are transmitted along with the message which serve as check bits to identify the location of any errors in the data message.

The amount and type of errors that can be corrected depends upon the number of check bits and the code used to generate the check bits. Occasionally it becomes desirable to change the number of check bits or type of code employed where the communication channel is altered, or a different type of error is anticipated. Separate apparatus can be provided for each coding scheme and operation can be transferred from one apparatus to the other. However, this often causes unnecessary duplication of certain portions of the circuitry in the apparatus for each coding scheme.

It is an object of the present invention to provide an improved circuit useful in data communication systems.

It is another object of the present invention to provide an improved circuit capable of performing a plurality of different operations wherein each operation shares a common portion of the circuit.

Still another object of the present invention is to provide a new circuit which combines a plurality of basic building blocks in a manner permitting substitution or elimination of any block to change the overall operation of the circuit.

It is a further object of the present invention to provide an improved data transmission system.

Another object of the present invention is to provide an improved encoder circuit.

Still another object of the present invention is to provide an improved divider circuit.

These and other objects of the present invention are accomplished by providing a novel circuit for combining a plurality of basic building blocks, commonly referred to as shift registers. The circuit includes two adders which interconnect the shift registers to operate jointly upon an input sequence of data.

A switch may be provided at the input of one of the shift registers to sever its connection with the circuit permitting the remaining shift register to operate independently.

When the present invention is employed in a data transmission system the coding scheme may be altered to correct various types of errors. An advantage of the present invention is the use of a common shift register in different coding schemes.

A feature of the present invention is the ability to combine shift registers performing any operation to produce either an overall joint operation, or an individual several operation.

In accordance with another aspect of the present invention a detector is added to one of the shift registers to cause the combined circuit to perform as a decoder and error corrector in a data transmission system. The detector need only be connected to one of the shift registers permitting occasional severance of the remaining shift register from the circuit thereby obtaining the above features and advantages.

The foregoing and other objects, features and advantages of the invention will be apparent from the following more particular description of a preferred embodiment of the invention, as illustrated in the accompanying drawings.

Figure 2:
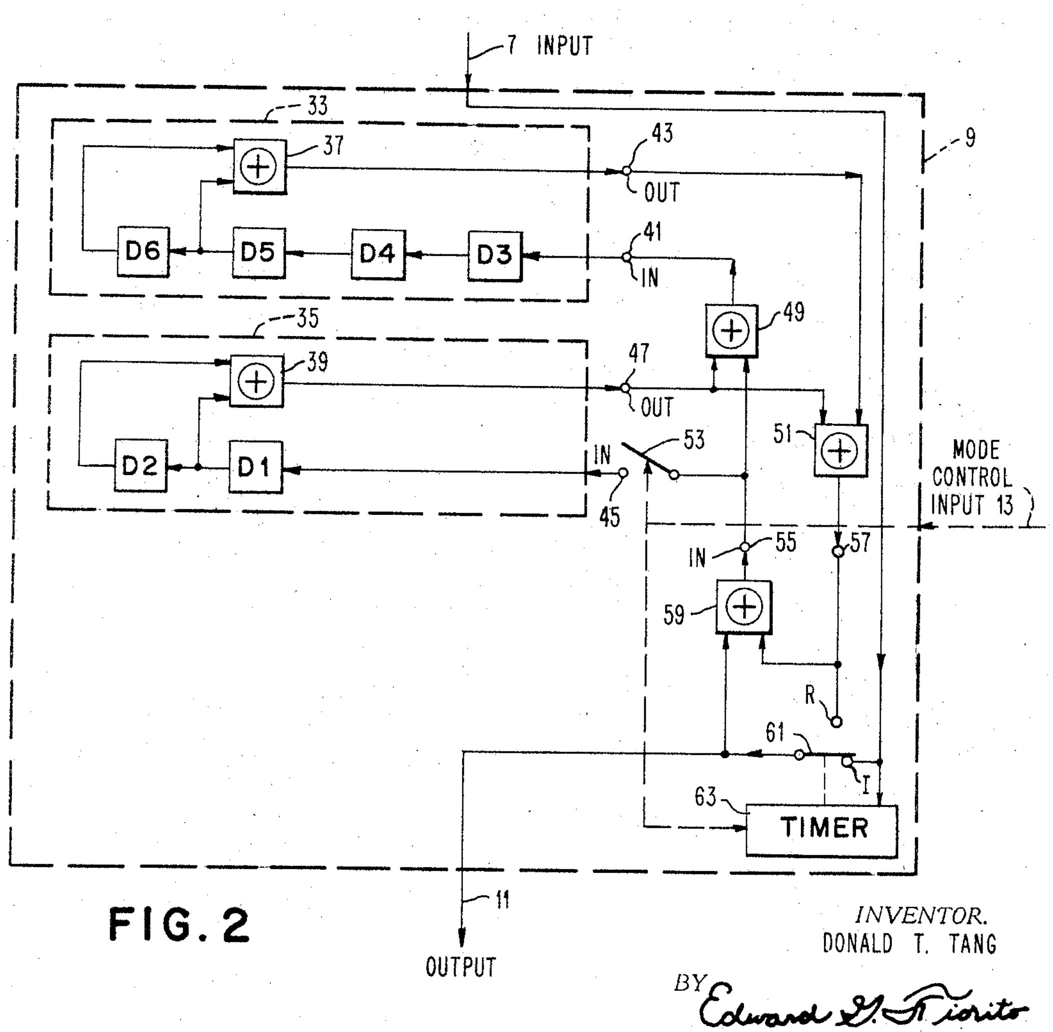
FIG. 2 is a diagram illustrating the details of the encoder shown in FIG. 1.
Figure 3:
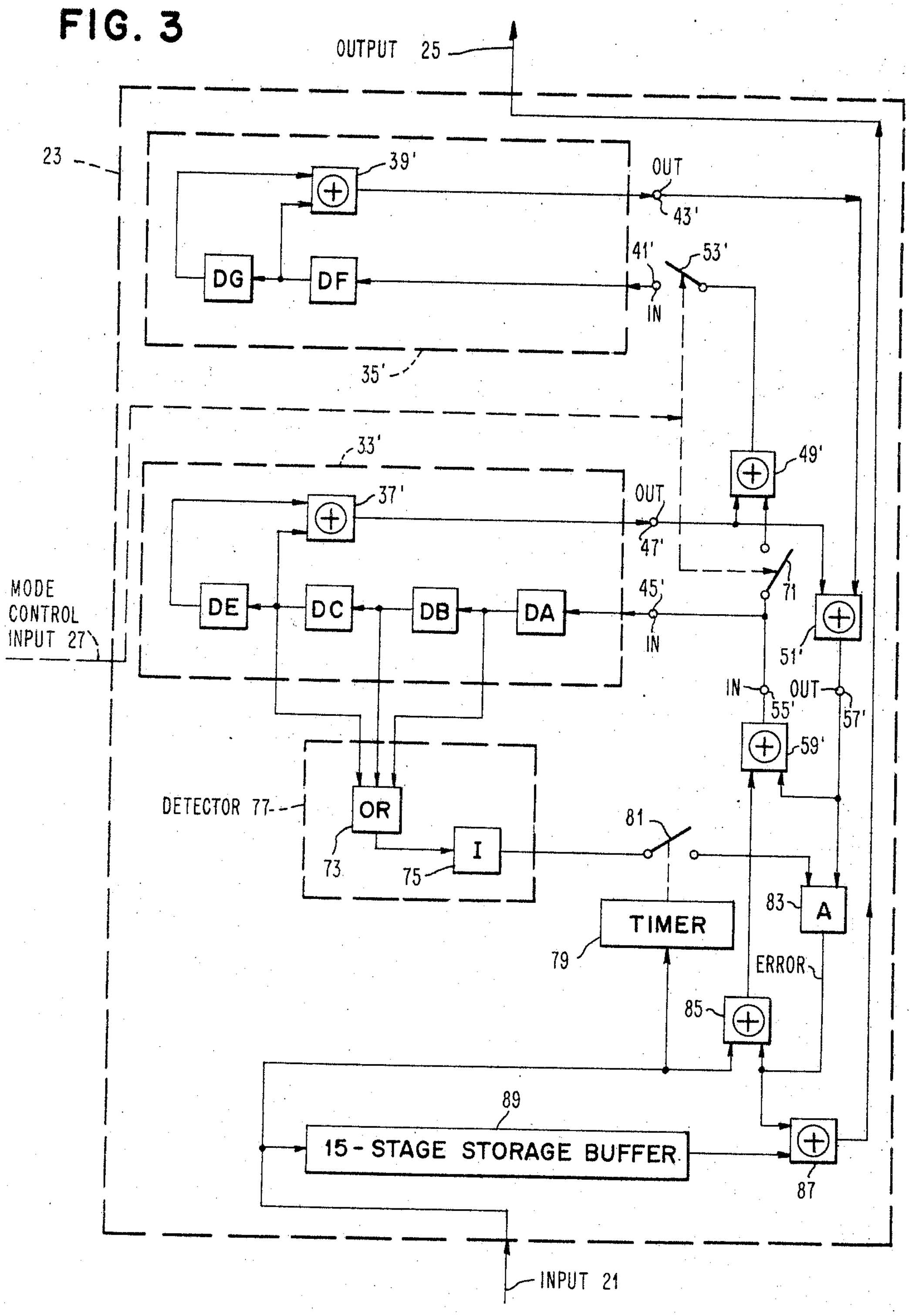
FIG. 3 is a diagram illustrating the details of the decoder shown in FIG. 1.

FIGS. *4a* and *4b* are charts illustrating the operation of the encoder shown in FIG. 2; and FIGS. *5a* and *5b* are charts illustrating the operation of the decoder shown in FIG. 3.

Figure 1:
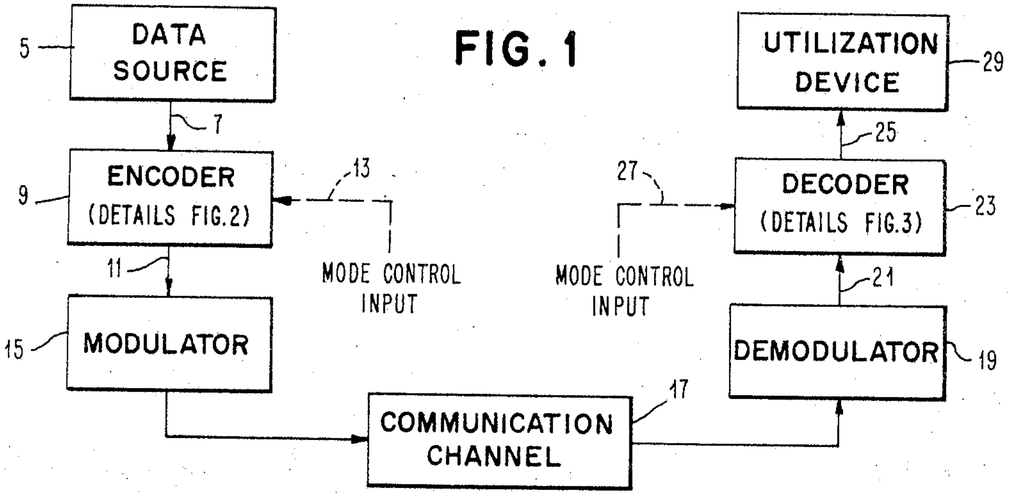
FIG. 1 is a block diagram illustrating the manner in which the present invention is employed in a data communication system.

The essential elements of a data transmission system are shown in FIG. 1. A data source 5 provides a sequence of binary digits on a line 7. A message group consists of either nine or eleven digits depending upon the coding scheme to be employed.

An encoder 9 accepts each message group appearing on line 7 and adds a number of check bits to each group providing an encoded sequence of digits on a line 11. A mode control input 13 selects the code employed to generate the check bits.

A modulator 15 prepares the encoded digits on line 11 for transmission through a communication channel 17. During transmission, errors are introduced so that the signal may be distorted or altered. A demodulator 19 accepts the signal supplied by channel 17 and converts it into a sequence of digits on a line 21 resembling the sequence of digits on line 11. However, any errors introduced during transmission through channel 17 cause corresponding errors to appear in the sequence of digits on line 21.

A decoder 23 examines the signal in line 21 including the message group and the check bits generated by encoder 9, and corrects certain types of errors producing a corrected output on a line 25. A mode control input 27 selects a coding scheme for decoder 23 corresponding to the one employed by encoder 9 during generation of the check bits.

The objective sought by the data transmission system shown in FIG. 1 is to provide a utilization device 29 with a sequence of digits on line 25 identical to the message supplied by data source 5. Various types of errors can be corrected by employing different types of coding schemes. For example, by adding four check bits to a group of eleven binary digits, a single error occuring during transmission in any of the 15 bits may be corrected. By adding six check bits to a group of nine binary digits any number of errors which occur within a span of three consecutive digits may be corrected. The check bits are commonly referred to as redundant bits, because they add no information to the message group. A higher redundancy increases the ability to correct errors. Mode control inputs

13 and 27 select the amount of redundancy to be used and therefore alter the capability of the transmission system shown in FIG. 1 to correct errors.

The details of the encoder 9 and decoder 23 are shown in FIGS. 2 and 3, respectively. Two coding schemes with different degrees of redundancy are illustrated by the circuits of FIGS. 2 and 3. With the aid of the charts in FIGS. 4*a* and *b* and FIGS. 5*a* and *b*, the operation of encoder 9 and decoder 23 upon two typical sequences of binary digits are described. The examples include the correction of a single error in a low redundancy mode of operation.

FIG. 2 illustrates the details of encoder 9. A pair of basic building blocks 33 and 35 containing shift registers, includes a group of delay stages D1–D6. The stages D1–D6 may be either delay devices, or a single stage of an ordinary binary shift register performing the function of delaying the signal applied to each stage a unit of time equal to the interval between digits in the binary sequence supplied by data source 5 in FIG. 1.

Also included in the shift register blocks 33 and 35 are two adder units 37 and 39. Where binary digits are to be encoded, the adders 37 and 39 each perform modulo-two addition or the equivalent of an exclusive-or function.

Shift register block 33 is provided with an input terminal 41 and an output terminal 43, while shift register block 35 is provided with an input terminal 45 and an output terminal 47. In operation a sequence of binary digits applied to input terminals 41 or 45 are converted by the delay stages D1–D6 and adders 37 and 39 into a new sequence of binary digits at output terminals 43 or 47.

In accordance with the present invention the input and output terminals 41, 43, 45 and 47 are interconnected in a manner producing a joint operation of shift register blocks 33 and 35, or a separate individual operation of shift register block 33.

A pair of adder unit 49 and 51 perform the same function as adders 37 and 39. A switch 53 alternately couples and uncouples signals to input terminal 45. An input terminal 55 provides a means for accepting binary digits which are applied to switch 53 and to one input of adder 49. Output terminal 47 is connected to the remaining input of adder 49 and to an input of adder 51. The output of adder 49 is connected to input terminal 41, while output terminal 43 is connected to the remaining input of adder 51. Adder 51 provides a sequence of binary digits at an output terminal 57.

An adder 59 is connected so that one input is received from output terminal 57 and the remaining input is connected to a switch 61. The output from adder 59 is applied to input terminal 55. Switch 61 is operated by a timer 63 to connect either one of a pair of terminals I, or R to the input of adder 59, and also to output line 11. Timer 63 may include a clock, counter or other well known devices operated in synchronism with the flow of digits. Output terminal 57 is connected to terminal R, while line 7 is connected to terminal I and also to an input of timer 63.

In operation timer 63 begins its cycle with the first digit ("1" or "0") in the message word sequence on line 7. In accordance with the coding scheme illustrated by this embodiment, timer 63 transfer switch 61 from terminal I to terminal R after either the 9th digit or the 11th digit depending upon the condition of mode control input 13. The timer 63 returns the switch 61 to the terminal I after the 15th digit. Mode control input 13 may be an ordinary mechanical linkage which operates switch 53 and changes the setting (9 or 11 digits) of timer 63. In the low redundancy mode of operation switch 53 is maintained in the open position as shown, and timer 63 transfers switch 61 after the 11th digit in the message group appearing on line 7. In the high redundancy mode, input 13 maintains switch 53 closed and effects the transfer of switch 61 from terminal I to terminal R after the 9th digit in the message group.

When the mode control input 13 sets switch 53 in the open position, no input signals are applied to terminal 45 and therefore no output signals appear on terminal 47. Adders 49 and 51 receive no signal from output terminal 47 and merely perform the function of coupling the signals on terminal 55 to terminal 41 and the signals on terminal 43 to terminal 57. With switch 61 in the position as shown in FIG. 2 the encoder 9 performs the function of a divider in a conventional manner such as that described in the text "Error-Correcting Codes" by W. Peterson, published by the MIT Press, second printing, March 1962, particularly p. 111.

The input sequence of binary signals represent the coefficients of the polynomial to be divided. The divisor is referred to as the generator polynomial denoted by $g_1(x)$. In the specific embodiment shown in FIG. 2, the generator polynomial $g_1(x)$ equals $x^4+x+1$. This polynomial uniquely specifies the connections of shift register block 33. The number of delay stages D3–D6 equals the degree (4) of the polynomial $g_1(x)$. Each term of the polynomial corresponds to an input of adder unit 37, with the exception of the highest order term ($x^4$) which is disregarded. Therefore, the output of D6 is connected to adder 37 which corresponds to the term *l* of polynomial $g_1(x)$, and the output of D5 is connected to adder 37 which corresponds to the term $x$ of polynomial $g_1(x)$. There is no connection to adder 37 corresponding to term $x^4$. The correspondence between terms of generator polynomials and adder units is similar to the well-known technique of implementing a multiplication circuit set forth in the Peterson text above. By changing the total number of delay stages and connections to the adder unit, or units, shift register blocks corresponding to different generator polynomials can be obtained.

The quotient resulting from the division of the input polynomial on line 7 by the generator polynomial in shift register 33 appears on input terminal 55. This quotient is not used in the present embodiment. Instead, the remainder of this division operation is employed as the check bits. The remainder is obtained by transferring switch 61 from terminal I to terminal R after the complete message group of binary digits has been received on line 7. The message group appearing on line 7 is passed through encoder 9 and appears at output line 11. After the last digit in the message group switch 61 is transferred to terminal R causing the remainder of the division operation to be coupled to output 11. The number of check bits in the remainder is either four or six depending upon the amount of redundancy desired. Further details on the manner in which check bits are generated by the separate and independent operation of a shift register such as the one designated 33 may be found in the article "Error-Correcting Codes and their Implementation for Data Transmission Systems" by J. Meggitt, IRE Transactions on Information Theory, October 1961, pp. 234–244, particularly p. 235.

LOW REDUNDANCY MODE

The chart in FIG. 4*a* illustrates the specific operation of shift register 33 in response to a typical sequence of eleven binary digits on input line 7 (10010000110) shown in the second column of the chart of FIG. 4*a*. Each digit represents a coefficient of a term of a polynomial. This typical sequence represents the polynomial $$x^{10}+x^7+x^2+x$$

The first column lists the time intervals T0 through T15 during which the encoding operation takes place for a message group of eleven digits. Up to and including time T11 switch 61 is positioned on terminal I. During times T12 through T15 the check bits are generated with switch 61 positioned on terminal R. For this example the encoder 9 is operated in a low redundancy mode with switch 53 open and shift register 35 inactive. Adders 49 and 51 perform no logical operations since output terminal 47 produces no signals.

Columns 3–6 of the chart in FIG. 4*a* indicate the contents of delay stages D6, D5, D4 and D3 respectively. The last column of the chart in FIG. 4*a* indicates the sequence of digits appearing at terminal R. At time T0 the input 7 is "0" as well as delay stages D3–D6 and terminal R. At time T1 the first digit of the message word appears at input 7 and is coupled through switch 61, adders 59 and 49 to delay stage D3 storing a "1" therein. The "1" in delay stage D3 is transferred to stage D4 and then stage D5 during times T2 and T3. At time T4, the output of delay stage D5 is fed back through adder 37 and adder 51 to one input of adder 59. The other input of adder 59 receives a "1" from input line 7 at time T4 causing a "0" output from adder 59 in accordance with the exclusive-or function.

Adder 37 produces a "0" output in response to the presence of "1" digits at both of its inputs at time T13. By inspection of the third and fourth columns of the chart in FIG. 4*a*, it can be seen that adder 37 receives "1" digits on both inputs at time T13 only. In a similar manner inspection of the second and last columns of the chart in FIG. 4*a* indicates that adder 59 produces a "0" output in response to the presence of "1" digits on both of its inputs at times T4 and T9. It may be seen that the entire operation of the encoder 9 shown in FIG. 2 with switch 53 open is described by the chart in FIG. 4*a*. After time T11, switch 61 is transferred from terminal I to terminal R causing the last four digits of the last column (1101) to be coupled to output 11. These digits are the check bits corresponding to the remainder of $$x^4(x^{10}+x^7+x^2+x)$$

modulo (divided by) $x^4+x+1$, which are found to be $x^3+x^2+1$, or 1101.

HIGH REDUNDANCY MODE

Operation of the encoder 9 in the high redundancy mode is described in detail with reference to the chart in FIG. 4*b*. In this mode the switch 53 is closed and shift register 35 is connected into the circuit performing jointly with shift register 33. Therefore the chart in FIG. 4*b* is expanded to include two more columns corresponding to the contents stored in delay stages D1 and D2. The remaining columns of the chart in FIG. 4*b* are similar to those appearing in the chart in FIG. 4*a*.

Shift register 35 is connected according to the generator polynomial $g_2(x)=x^2+x+1$. The combined generator polynomial for encoder 9 when operating in the high redundancy mode is therefore $$g_c(x)=g_1(x)\cdot g_2(x)=(x^4+x+1)(x^2+x+1)=x^6+x^5+x^4+x^3+1$$

The assumed input on line 7 for this example is the sequence of binary digits 110000100 corresponding to the polynomial $x^8+x^7+x^2$.

In the high redundancy mode of operation adders 49 and 51 perform logical operations in response to signals appearing on terminal 47. Referring to the chart in FIG. 4*b* at time S3 delay stages D1 and D5 each store "1" digits which are transferred at time S4 through adders 39 and 37 respectively to the inputs of adder 51. Therefore at time S4 the output of adder 51 is "0" producing a "0" at terminal R.

Adder 49 produces a "0" output in response to the presence of "1" digits at both of its inputs at time S5. This may be seen by observing the "1" digit stored in delay stage D2 at time S4. The output of delay stage D2 is coupled through adder 39 to one input of adder 49 at time S5. At the same time the output of delay stage D2 is fed through the loop containing adder 51 and adder 59 back to the other input of adder 49 causing a "1" to be present on both inputs thereof.

The detailed operation of encoder 9 in the high redundancy mode during each of the time intervals S0 through S15 is completely represented by the chart in FIG. 4*b*. After time S9 switch 61 is transferred from terminal I to terminal R causing the last six digits appearing on terminal R to be coupled to output 11. These bits represent the check bits which are transmitted along with the nine message digits. The check bits represent the remainder of $x^6(x^8+x^7+x^2)$ modulo $x^6+x^5+x^4+x^3+1$, which are found to be $x^5+x^4+x^2$, or 110100.

DECODER

Having described the details of encoder 9, the details of decoder 23 shown in FIG. 3 are now described. The purpose of the decoder 23 is to correct errors in the message digits through the use of the check bits. A pair of shift register blocks 33′ and 35′ have identical interconnections as shift registers 33 and 35, respectively in FIG. 2. The upper and lower position of shift registers 33′ and 35′ are reversed in FIG. 3. Adders 37′ and 39′ correspond to the adders 37 and 39 in FIG. 2. A group of delay elements DA–DG correspond to delay elements D1–D6.

Terminals 41′, 43′, 45′, 47′, 55′ and 57′ correspond to the terminals in FIG. 2 with like numerical designations. The interconnections between these terminals and a group of adders 49′, 51′ and 59′ are identical to the interconnections between adders 49, 51 and 59 and the corresponding terminals in FIG. 2, with the following two exceptions. First, a switch 53′ is placed in series with terminal 41′ whereas switch 53 in FIG. 2 is placed in series with terminal 45′. Second, a switch 71 is placed in series with the input to adder 49′ coupled to terminal 55′. Continuing with the details of FIG. 3, an OR gate 73 and inverter 75 form a detector 77 coupled to the outputs of delay stages DA, DB and DC. A timer 79 operated a switch 81. An AND gate 83, a pair of adders 85 and 87, and a 15-stage storage buffer 89 are the remaining elements in the decoder 23 which are not found in encoder 9. The detector 77 output is coupled through switch 81 to one input of AND gate 83. The other input of AND gate 83 is connected to terminal 57′. A "1" at the output of AND gate 83 indicates the presence of an error in the message digits.

Timer 79 operates in synchronism with the input signals on line 21. After the 15th digit, switch 81 is closed and remains closed for 15 digit intervals until a new cycle is begun. The input on line 21 is also fed to adder 85 along with the output of AND gate 83. The output of adder 85 is applied to an input of adder 59′. Storage buffer 89 receives the encoded message on line 21 delaying it for a time equal to 15 digits before applying it to one input of adder 87. The other input of adder 87 is received from the output of AND gate 83. Adder 87 supplies the signal on output line 25.

The operation of decoder 23 in the low redundancy mode is represented by the chart in FIG. 5*a*. As in the case of the charts in FIGS. 4*a* and *b* the contents of delay stages DA–DE at times NO–N30 are represented by the five columns designated DA–DE. The signals at input 21, terminal 57′, the output of detector 77 and the output (error) of AND gate 83 are illustrated in the remaining four columns of the chart in FIG. 5*a*.

To illustrate the operation, the input received on line 21 is assumed to be the same as that appearing in the last column of the chart in FIG. 4*a* with the exception of the fifth digit which is changed from a "0" to a "1." The error occurs during transmission through communication channel 17 shown in FIG. 1. During the decoding operation the error is corrected and the proper information digits are provided on output terminal 25.

In the low redundancy mode of operation, mode control input 27 fixes the switches 53′ and 71 in the open position as shown. The first digit appearing at time N1 on line 21 is fed to buffer 89 where it is delayed 15 units of time before being applied to adder 87 at time N16. The first digit is also applied through adders 85 and 59 to delay stage DA. During the next three time intervals this digit is shifted through the remaining stages of shift register 33′ and additional digits are applied to the input terminal 45.

After the fifteenth digit is received timer 79 closes switch 81. Detector 77 observes the outputs of delay stages DA–DC by the connections to OR gate 73 inverter 75 supplies an output when no signals are stored in the DA–DC stages. The first output from detector 77 occurs at time N20. At the same time a signal appears on terminal 57′ causing both inputs of AND gate 83 to be present. AND gate 83 supplies an error signal to one input of adder 87 which receives a delayed input signal corresponding to the fifth digit of the message from buffer 89. The fifth digit changes from a "1" to a "0" in accordance with the exclusive-OR operation of adder 87 thereby correcting the error introduced during transmission.

AND gate 83 provides an output at time N20 only. This may be seen by observing the two columns in the chart of FIG. *5a* representing the conditions at terminal 57′ and the output of detector 77. A "1" appears simultaneously in both columns only at time N20. Therefore the input signal on line 21 is coupled without change to out put line 25 except for the single error in the fifth digit which is corrected by the operation of adder 87.

HIGH REDUNDANCY MODE

The decoder 23 operates in a similar manner in the high redundancy mode. Due to the increased capabilities of this coding scheme two errors appearing in the message are capable of correction. For this operation mode control 27 sets switches 53′ and 71 in the closed position. Shift register 35′ joins in the operation of shift register 33′ causing adders 49′ and 51′ to begin performing logical operations. As in the low redundancy mode timer 79 closes switch 81 after the fifteenth digit is received on input line 21.

The chart in FIG. *5b* illustrates the operation of the decoder 23 in the high redundancy mode. Two columns in addition to those appearing in FIG. *5a* are added, for delay stages DF and DG. The input digits appearing in the second column of the chart in FIG. *5b* are the same as those appearing in the last column of the chart in FIG. *4b* except for the ones appearing at times L9 and L11. These changes are due to errors introduced during transmission through communication channel 17 shown in FIG. 1.

At time L24 both inputs of AND gate 83 are present producing an input to adder 87. At the same time the ninth digit of the message emerges from buffer 89. At this time the error "1" is removed from the message and the "1" is changed to a "0" and supplied to output 25.

At time L26 AND gate 83 supplies an input to adder 87 indicating another error. The "0" at the eleventh digit of the message is changed to a "1" by the exclusive OR operation of adder 89. By inspection of the chart in FIG. *5b* it may be seen that AND gate 83 supplies only two error signals at the times corresponding to the appearance of the 9th and 11th digits from buffer 89 thereby correcting the two errors introduced during transmission before supplying the message to output terminal 25.

In summary what has been shown is a novel circuit including adders 49 and 51 for interconnecting a plurality of shift register blocks such as 33 and 35. The combination can be used to perform multiplication, division, encoding or decoding, which are useful operations in data transmission systems. The circuit permits the substitution of shift registers 33 and 35 for any device generating a signal at its output terminal 43 (or 47) which is a function of the signal applied to its input terminal 41 (or 45).

Further, by inserting a switch 53 one shift register 35 can be alternately connected and disconnected from the circuit. The remaining shift register 33 performs independently, or jointly with shift register 35. Therefore it is not necessary to duplicate the contents of shift register 33 to produce separate encoders 9 for the low redundancy mode and for the high redundancy mode.

When employing the circuit of the present invention as a decoder shown in FIG. 3, the detector 77 need be connected to only one of the shift registers 33′. While the remaining shift register 35′ is alternately connected and disconnected from the operation of decoder 23, shift register 33′ remains in operation during both the high and low redundancy modes making it unnecessary to change the connections of detector 77 when the mode of operation of decoder 23 is varied.

It may be observed that the cycle time of the decoder 23 is twice as long as the encoder 9. Therefore two decoders may be used to service a single encoder, or the encoder may be periodically stopped.

The circuit of the present invention can be extended to interconnect more than two shift registers such as 33 and 35. In this modification input and output terminals 55 and 57 shown in FIG. 2 are considered to be the input and output terminals of a shift register such as input terminal 41 and output terminal 43. Shift register 33 would then contain within the broken line rectangle the entire circuitry between the input terminal 55 and output terminal 57 shown in FIG. 2. Any number of shift registers can be cascaded in this manner using two adders such as 49 and 51 for each additional shift register.

While the illustrative embodiment of the present invention operates on binary digits, other digits such as ternary digits may be used. In the ternary system modulo-3 adders are used instead of the modulo-2 adders illustrated in the present embodiment. Any other prime numbers such as 5, 7, 11, 13 etc., and their powers may be employed in the present invention.

To illustrate the manner in which the present invention is used, a communication channel 17 was shown in FIG. 1. However, the encoding and decoding devices employing the present invention may be used to store and retrieve data from magnetic tape or other memory facilities. The present invention may also be used in digital systems which require several modes of operation involving multiplication and division.

While the invention has been particularly shown and described with reference to a preferred embodiment thereof, it will be understood by those skilled in the art that various changes in form and details may be made therein without departing from the spirit and scope of the invention.

What is claimed is:

1. Apparatus for converting an input sequence of signals representative of digits into another functionally related output sequence of signals representative of digits, comprising:

a first and a second generator means each having an input terminal and an output terminal for generating a sequence of signals representative of digits at said output terminal which is a predetermined function of the sequence of signals representative of digits applied to the input terminal thereof;

a first and a second adder each having two inputs and an output; and coupling means for connecting the output of said first generator means to one of the inputs of both said adders, connecting the output of said second generator means to the remaining input of said second adder, connecting the output of said first adder to the input of said second generator means, and coupling said input sequence of signals representative of digits to the input of said first generating means and to the remaining input of said first adder, whereby the output of said second adder produces said output sequence of signals representative of digits.

2. Apparatus as defined in claim 1 further characterized by the addition of a switch connected in series with the input of said first generator means to selectively block the application of said input sequence of signals representative of digits thereby altering the functional relationship between said output and input sequences of signals representative of digits.

3. Apparatus as defined in claim 1 wherein said generator means each include at least one stage of delay means for introducing a delay between the application of a digit at the input terminal and the appearance of the digit at the output terminal thereof.

4. Apparatus as defined in claim 1 wherein said input and output sequences of signals representative of digits are in binary form and said adders are modulo-two adders.

5. Apparatus for dividing an input polynomial consisting of an input sequence of digits by another predetermined polynomial to produce an output sequence of signals representative of digits representing the quotient of said input and predetermined polynomials, comprising:

a first and a second generator means each having an input terminal and an output terminal for generating a sequence of signals representative of digits at said output terminal in response to the application of a sequence of signals representative of digits at said input terminal, the relationship therebetween being a function of said predetermined polynomial;

a first, a second and a third adder each having two inputs and an output; and coupling means for connecting the output of said first generator means to one of the inputs of said first and second adders, connecting the output of said second generator means to the remaining input of said second adder, connecting the output of said first adder to the input of said second generator means, connecting the output of said third adder to the input of said first generator means and to the remaining input of said first adder, connecting the output of said second adder to one of the inputs of said third adder, and coupling said input sequence of signals representative of digits to the remaining input of said third adder, whereby the output of said second adder produces said output sequence of signals representative of digits representing said quotient.

6. Apparatus as defined in claim 5 further characterized by the addition of a switch connected in series with the input of said first generator means to selectively block the connection between said third adder and said first generator means thereby altering said predetermined polynomial and the resulting quotient at the output of said second adder.

7. Apparatus as defined in claim 5 wherein said generator means each include at least one stage of delay means for introducing a delay between the application of a signal representative of a digit at said input terminal and the appearance of the digit at the output terminal.

8. Apparatus as defined in claim 5 wherein said input and output sequences of signals representative of digits are in binary form and said adders are modulo-two adders.

9. Apparatus for encoding an input polynomial represented by an input sequence of signals representative of digits into an output sequence of signals representative of digits representing said input polynomial and the remainder resulting from the division of said input polynomial by a predetermined polynomial, comprising:

a first and second generator means each having an input terminal and an output terminal for generating a sequence of signals representative of digits at said output terminal in response to the application of a sequence of signals representative of digits at said input terminal, the relationship therebetween being a function of said predetermined polynomial;

a first, a second and a third adder, each having two inputs and an output;

coupling means for connecting the output of said first generator means to one of the inputs of said first and second adders, connecting the output of said second generator means to the remaining input of said second adder, connecting the output of said first adder to the input of said second generator means, connecting the output of said third adder to the input of said first generator means and to the remaining input of said first adder, connecting the output of said second adder to one of the inputs of said third adder; and switching means for coupling said input sequence of signals representative of digits to the remaining input of said third adder and to an output line, and for connecting the output of said second adder to said remaining input of said third adder and to said output line at the end of the application of said input sequence of signals representative of digits, whereby said input polynomial and remainder are provided at said output line.

10. Apparatus as defined in claim 9 further characterized by the addition of a switch connected in series with the input of said first generator means to selectively block the connection between said third adder and said first generator means, thereby altering said predetermined polynomial and the resulting remainder.

11. Apparatus as defined in claim 9 wherein said generator means each include at least one stage of delay means for introducing a delay between the application of a signal representing a digit at the input terminal and the appearance of the signal representing a digit at the output terminal thereof.

12. Apparatus as defined in claim 9 wherein said input and output sequences of signals representative of digits are in a binary form and said adders are modulo-two adders.

References Cited

UNITED STATES PATENTS

| | | | |
|---|---|---|---|
| 2,954,432 | 9/1960 | Lewis | 340—146.1 |
| 2,954,433 | 9/1960 | Lewis et al. | 340—146.1 |
| 3,024,444 | 3/1962 | Barry et al. | 340—146.1 |
| 3,154,744 | 10/1964 | Maley | 328—92 |

MAYNARD R. WILBUR, *Primary Examiner.*

JEREMIAH GLASSMAN, *Assistant Examiner.*